No. 827,973. PATENTED AUG. 7, 1906.
C. J. HANDEL.
DUMPING WAGON.
APPLICATION FILED JAN. 5, 1906.
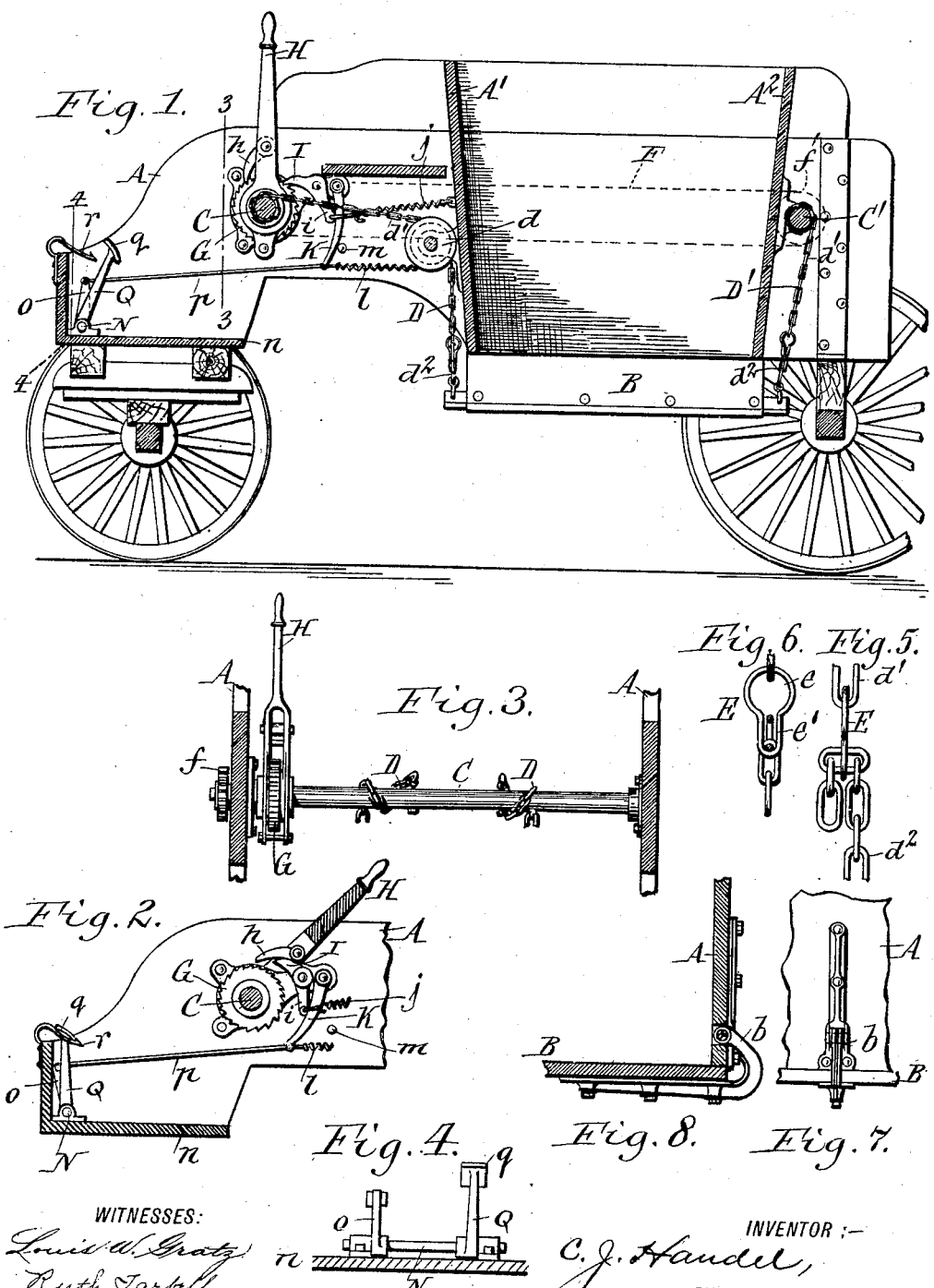
WITNESSES:
INVENTOR:—
C. J. Handel,
BY
Geyer & Popp
ATTORNEYS.

UNITED STATES PATENT OFFICE.

CHRISTOPHER J. HANDEL, OF BUFFALO, NEW YORK.

DUMPING-WAGON.

No. 827,973.          Specification of Letters Patent.          Patented Aug. 7, 1906.

Application filed January 5, 1906. Serial No. 294,720.

*To all whom it may concern:*

Be it known that I, CHRISTOPHER J. HANDEL, a citizen of the United States, residing at Buffalo, in the county of Erie and State of New York, have invented new and useful Improvements in Dumping-Wagons, of which the following is a specification.

This invention relates to a dumping-wagon, and has the object to provide a lifting and releasing mechanism for the bottom of the box which is of simple and reliable construction and which can be easily operated.

In the accompanying drawings, Figure 1 is a vertical longitudinal section of a dumping-wagon equipped with my improved bottom lifting and releasing mechanism. Fig. 2 is a fragmentary view of the same, showing the lifting and releasing mechanism in a different position from that indicated in Fig. 1. Fig. 3 is a fragmentary cross-section in line 3 3, Fig. 1. Fig. 4 is a similar section taken in line 4 4, Fig. 1. Figs. 5 and 6 are views taken at right angles to each other and showing the means whereby the lifting-chains are adjusted with reference to the bottom of the box. Fig. 7 is a fragmentary side elevation of one of the hinges connecting the side wall of the box with the bottom thereof. Fig. 8 is a cross-section thereof.

Similar letters of reference indicate corresponding parts throughout the several views.

A represents the longitudinal side-boards of the wagon frame or body, the rear portions of which are connected by transverse front and rear walls $A'$ $A^2$ and form, with the latter, the receptacle or box of the wagon in a well-known manner.

B represents the bottom of the box, which consists of two vertically-swinging doors or sections connected at their outer longitudinal edges to the lower edges of the box side walls by means of hinges $b$ in the usual way.

C C' represent the front and rear hoisting-drums, which are journaled transversely and horizontally in bearings on the side-boards of the wagon in front and in rear of the box. The front drum is connected with each of the bottom sections by a chain D, passing with its intermediate part around a guide-wheel $d$ on the front wall of the box. The rear drum is connected with each section of the bottom by a similar chain D'. For the purpose of adjusting the length of these chains so that they operate to close the bottom tightly against the lower end of the box, each of these chains is divided into two sections $d'$ $d^2$, and one of these sections has an adjusting-link E, which is constructed so that it is wide at one end and narrow at the other end, as shown at $e$ $e'$, Fig. 6. This construction of the link E permits of passing the slack end of the opposing chain through its large part $e$ for adjusting the length of the same as a whole, after which one of the links of the slack end is dropped into the narrow part of the adjusting-link. In this position the links of the slack end on opposite sides of the adjusting-link serve to prevent the displacement of the adjusting-link on the slack end, thereby holding the chain in its adjusted position.

F represents a chain belt which passes around sprocket-wheels $f$ $f'$ at the outer end of the drums C C', causing the latter to turn in unison.

G represents a ratchet-wheel secured to the front drum adjacent to one of the side-boards of the wagon frame or body.

H represents a ratchet or hand lever which has its lower part divided or bifurcated and pivoted concentric with the drum and ratchet-wheel on opposite sides of the latter.

$h$ represents a lifting pawl or dog pivoted on the hand-lever and engaging with the teeth of the ratchet-wheel.

I represents a forwardly-projecting detent pawl or dog pivoted on a stationary part of the frame in rear of the front drum and ratchet-wheel and moving in a vertical plane into and out of engagement with the teeth of the ratchet-wheel. This detent-pawl is provided with a short downwardly-projecting arm $i$, which is connected by a spring $j$ with the front wall of the box, whereby the detent-pawl is yieldingly held in engagement with the teeth of the ratchet-wheel.

K represents a comparatively long trip or releasing lever arranged in rear of the pawl-arm $i$ and pivoted at its upper end to a stationary part on the frame so as to swing in a vertical plane. This lever is moved rearwardly out of operative engagement with the actuating-arm $i$ of the detent-pawl by means of a spring $l$, which connects the lower end of the lever with the front wall of the box. The rearward movement of the trip-lever is limited by a stop-pin $m$, arranged on the adjacent part of the wagon-frame or by any other suitable means.

N represents a horizontal rock-shaft journaled transversely in bearings on the transverse front part or platform $n$, which connects the side-boards of the frame. At one end this rock-shaft is provided with an upright arm O, which is connected by a rod $p$ with the lower end of the trip-lever, while its opposite end is provided with an upright actuating-arm Q, having a treadle $q$ at its upper end.

$r$ represents a spring-catch arranged on the wagon-frame in front of the treadle and adapted to engage with the latter upon moving the same forwardly.

Upon oscillating the hand-lever H its lifting-pawl engages operatively with the teeth of the ratchet-wheel during the forward stroke and moves idly backward over these teeth during the backward stroke, whereby the two drums are turned forward intermittently and the chains are wound upon the same until the bottom of the box has been raised into its closed position. Backward movement of the drums at this time is prevented by means of the detent-pawl which engages with the teeth of the ratchet-wheel. When it is desired to dump the wagon, the hand-lever is moved into its rearmost position, so that the lifting-pawl is arranged over the detent-pawl. The treadle is then pushed forward by means of the foot, which movement is transmitted by the rock-shaft N, intermediate arm O, and connecting-rod $p$ to the trip-lever, causing the latter to move forwardly and operatively engage the arm $i$ of the detent-pawl and turn the same also in this direction. When this occurs, the detent-pawl is lifted out of engagement from the teeth of the ratchet-wheel and also engages with the under side of the lifting-pawl, whereby the latter is raised out of engagement from the teeth of the ratchet-wheel, as shown in Fig. 2, thereby releasing both drums and permitting the chains to unwind therefrom and the bottom to drop for discharging the load, which presses downwardly on the bottom. In moving the treadle into its foremost position the same is engaged by the catch $r$, which latter holds the treadle and the pawls operatively connected therewith in an idle position as long as required. For restoring the pawls to their working position in engagement with the teeth of the ratchet-wheel it is only necessary to disengage the catch $r$ from the treadle, which may be done with the foot.

By providing the detent-pawl with a short arm $i$, which is connected by a spring with a stationary part, and releasing the same from the ratchet-wheel by means of a long trip-lever the detent-pawl is free to move easily independent of the releasing mechanism during the operation of lifting the bottom, but a powerful leverage is provided for releasing the detent-pawl from the ratchet-wheel when required to dump the load.

I claim as my invention—

1. In a dumping-wagon, the combination of a box having a movable bottom, a drum operatively connected with said bottom, a ratchet-wheel secured to the drum, a ratchet-lever having a lifting-pawl engaging with the ratchet-wheel, a detent-pawl engaging with the ratchet-wheel, a trip-lever adapted to engage with the detent-pawl, and a treadle operatively connected with the trip-lever, substantially as set forth.

2. In a dumping-wagon, the combination of a box having a movable bottom, a drum operatively connected with said bottom, a ratchet-wheel secured to the drum, a ratchet-lever having a lifting-pawl engaging with the ratchet-wheel, a detent-pawl engaging with the ratchet-wheel in rear of the lifting-pawl and having a depending arm, a spring connecting with said arm and operating to hold the detent-pawl yieldingly in engagement with the ratchet-wheel, a trip-lever adapted to engage with said arm, a spring operating to withdraw said trip-lever from said arm, and a rock-shaft having an arm which carries a treadle and an arm which is connected by a rod with the trip-lever, substantially as set forth.

Witness my hand this 3d day of January, 1906.

CHRISTOPHER J. HANDEL.

Witnesses:
THEO. L. POPP,
E. M. GRAHAM.